United States Patent
Lai

(10) Patent No.: US 8,570,018 B2
(45) Date of Patent: Oct. 29, 2013

(54) HOT SWAPPABLE SYNCHRONOUS BUCK REGULATOR

(75) Inventor: Chun-An Lai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 370 days.

(21) Appl. No.: 13/151,259

(22) Filed: Jun. 1, 2011

(65) Prior Publication Data

US 2012/0212077 A1 Aug. 23, 2012

(30) Foreign Application Priority Data

Feb. 18, 2011 (TW) .............................. 100105480 A

(51) Int. Cl.
*H02M 3/156* (2006.01)
*H02M 1/36* (2007.01)

(52) U.S. Cl.
USPC .............. 323/284; 323/299; 323/901; 363/49

(58) Field of Classification Search
USPC ................. 323/282–285, 299, 351, 901, 908; 363/49

See application file for complete search history.

(56) References Cited

U.S. PATENT DOCUMENTS

| | | | |
|---|---|---|---|
| 5,442,515 A * | 8/1995 | Wallaert ........................ | 361/187 |
| 6,897,638 B2 * | 5/2005 | Miyanaga et al. ............ | 323/274 |
| 8,084,893 B2 * | 12/2011 | Fujii ............................... | 363/49 |
| 2009/0153115 A1 * | 6/2009 | Henmi .......................... | 323/282 |

* cited by examiner

*Primary Examiner* — Jessica Han
(74) *Attorney, Agent, or Firm* — Altis & Wispro Law Group, Inc.

(57) ABSTRACT

A synchronous buck regulator includes a voltage regulator, a sample unit, a switch element, a comparison unit, a time delay unit, and a control unit. The sample unit is connected to the external power source for sampling a voltage drop in the external power source. The comparison unit is connected to the sample unit for outputting a result-high signal when the current passing through the sample unit is greater than a predetermined current rating. The time delay unit is connected to the comparison unit for outputting a first result-low signal. The control unit is connected to the time delay unit and outputs a first a low level signal to the switch element according to the result-low signal. The switch element connects the sample unit and the voltage regulator and can isolate the voltage regulator from the external power source when the low level signal is received.

6 Claims, 1 Drawing Sheet

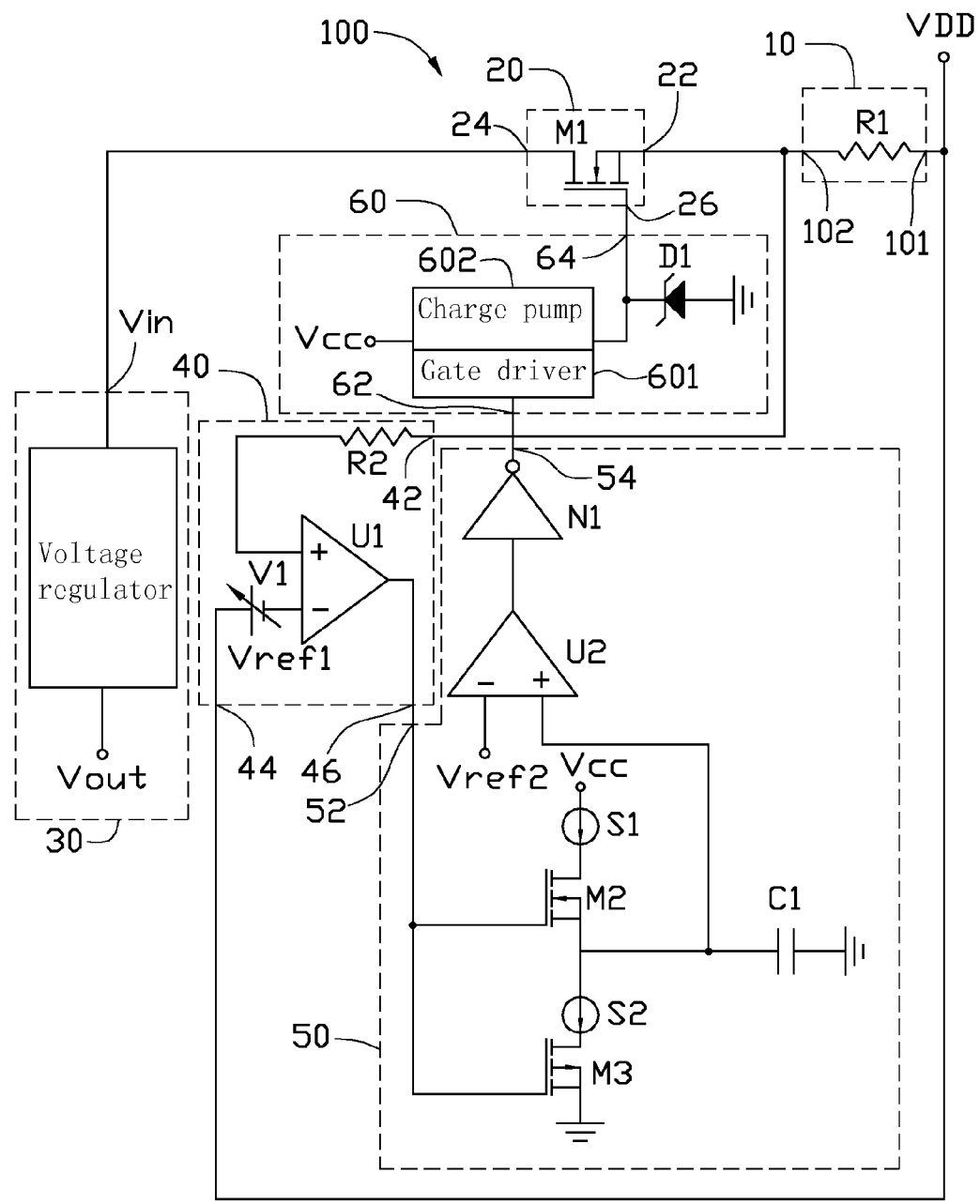

HOT SWAPPABLE SYNCHRONOUS BUCK REGULATOR

BACKGROUND

1. Technical Field

The present disclosure relates to synchronous buck regulators, and particularly, to a synchronous buck regulator capable of being hot swapped.

2. Description of Related Art

Typical synchronous buck regulators can not be directly connected to an electrical device unless the electrical device is first turned off, since the amount of current which will flow through the synchronous buck regulator as it connects to the electrical device will often exceed the predetermined current rating of the synchronous buck regulator.

Therefore, it is desirable to provide a hot swappable synchronous buck regulator which can overcome the limitations described above.

BRIEF DESCRIPTION OF THE DRAWING

The FIGURE is a circuit diagram of a hot swappable synchronous buck regulator, according to an exemplary embodiment.

DETAILED DESCRIPTION

An embodiment of the disclosure will now be described in detail, with reference to the accompanying drawing.

Referring to the FIGURE, a hot swappable synchronous buck regulator 100, according to an exemplary embodiment, includes a sample unit 10, a switch element 20, a voltage regulator 30, a comparison unit 40, a time delay unit 50, and a control unit 60.

The voltage regulator 30 has a predetermined current rating and includes a voltage input terminal Vin and a voltage output terminal Vout. The voltage regulator 30 may be damaged if input current into the voltage regulator 30 is greater than the predetermined current rating. The voltage input terminal Vin is connected to an external power source VDD via the switch element 20 and the sample unit 10. The voltage regulator 30 is configured for converting voltage provided by the external power source VDD input from the voltage input terminal Vin into a predetermined voltage and outputting the predetermined output voltage through the output terminal Vout. In one embodiment, the external power source VDD is configured for providing a voltage of about 12 volts, the predetermined output voltage is about 3.3 volts.

The sample unit 10 is configured for sampling a voltage drop of the external power source VDD. In the embodiment, the sample unit 10 includes a first resistor R1. The first resistor R1 includes a first end 101 and a second end 102. The first end 101 is connected to the external power source VDD. In one embodiment, the resistance of the first resistor R1 is about 0.02 ohms.

The switch element 20 includes a first terminal 22, a second terminal 24, and a control terminal 26. The switch element 20 is configured for connecting the first terminal 22 to the second terminal 24 when the control terminal 26 receives a high voltage (e.g., 15 volts), and disconnecting the first terminal 22 and the second terminal 24 when the control terminal 26 receives a low voltage (e.g., 0 volts). In the embodiment, the switch element 20 is a first transistor M1. The first transistor M1 is an n-channel metal oxide semiconductor (NMOS) transistor, wherein the source connection of the first transistor M1 serves as the first terminal 22, the drain connection of the first transistor M1 serves as the second terminal 24, and the gate connection of the first transistor M1 serves as the control terminal 26. The source connection of the first transistor M1 is connected to the second end 102 of the first resistor R1.

The comparison unit 40 includes a first input terminal 42, a second input terminal 44, an output terminal 46, a second resistor R2, a first comparator U1, and a transformer V1. The first input terminal 42 of the comparison unit 40 is connected to the second end 102 of the first resistor R1. The second input terminal 44 of the comparison unit 40 is connected to the external power source VDD. The second resistor R2 is connected between the positive terminal of the first comparator U1 and the first input terminal 42 of the comparison unit 40. The transformer V1 is connected between the negative terminal of the first comparator U1 and the second input terminal 44 of the comparison unit 40. The transformer V1 is configured for transforming the voltage of the external power source VDD into a first reference voltage Vref1 and inputting the first reference voltage Vref1 to the negative terminal of the first comparator U1. In one example, the first reference voltage Vref1 can be about 0.047 volts, while the resistance of the second resistor R2 can be about 1,000 ohms.

The time delay unit 50 includes an input terminal 52, an output terminal 54, a second transistor M2, a third transistor M3, a first current source S1, a second current source S2, a capacitor C1, a second comparator U2, and a NOT gate N1. The input terminal 52 of the time delay unit 50 is connected to the output terminal 46 of the comparison unit 40. The second transistor M2 is an n-channel metal oxide semiconductor (NMOS) transistor. The gate connection of the second transistor M2 is connected to the input terminal 52 of the delay unit 50. The drain connection of the second transistor M2 is connected to an internal power source Vcc through the first current source S1. The internal power source Vcc provides voltage to the first current source S1. The third transistor M3 is a p-channel metal oxide semiconductor (PMOS) transistor. The gate connection of the third transistor M3 is connected to the input terminal 52. The source connection of the third transistor M3 is grounded. The drain connection of the third transistor M3 is connected to the source connection of the second transistor M2 through the second current source S2. One end of the capacitor C1 is connected to the source of the second transistor M2, the other end is grounded. The positive terminal of the second comparator U2 is connected to the source connection of the second transistor M2. The negative terminal of the second comparator U2 is connected to a second reference voltage Vref2. The input terminal of the NOT gate N1 is connected to the output terminal of the second comparator U2. The output terminal of the NOT gate N1 serves as the output terminal 54 of the time delay unit 50. In one example, the voltage of the internal power source Vcc is about 5 volts, the first current source S1 is about 65 microamperes, the second current source S2 is about 3.5 microamperes, and the second reference voltage Vref2 is about 1.23 volts.

The control unit 60 includes an input terminal 62, an output terminal 64, a gate driver 601, a charge pump 602, and a zener diode D1. The input terminal 62 of the control unit 60 is connected to the output terminal 54 of the time delay unit 50 and the input terminal 62 is connected to the input terminal of the gate driver 601. The charge pump 602 is connected to the internal power source Vcc and to the gate driver 601. The internal power source Vcc is also configured for charging the charge pump 602. The output terminal of the charge pump 602 (output terminal 64) is connected to the gate of the first transistor M1. One end of the zener diode D1 is connected to the output terminal of the charge pump 602, and the other end is grounded. In one example, the breakdown voltage of the zener diode D1 is about 16.2 volts.

On initial connection, the external power source VDD passes through the first resistor R1 and provides a high voltage to the source connection of the first transistor M1. The gate driver 601 outputs a high voltage to the charge pump 602 and prompts the charge pump 602 to output a high voltage to the gate connection of the first transistor M1. The source connection of the first transistor M1 connects to the drain connection of the first transistor M1. The first transistor M1 is activated. A current $\Delta I$ passes through the first resistor R1 and a voltage drop $\Delta V$ occurs across the first resistor R1. The voltage drop $\Delta V$ becomes a conversion voltage through the second resistor R2. The conversion voltage is input to the positive terminal of the first comparator U1. When the current $\Delta I$ increases, the voltage drop $\Delta V$ will increase, and the conversion voltage will increase. When the amount of current $\Delta I$ increases to a threshold value, the conversion voltage will be equal to the first reference voltage Vref1. At threshold value, the amount of the current $\Delta I$ serves as the predetermined current rating of the voltage regulator 30. When the current $\Delta I$ becomes greater than the threshold value, the conversion voltage will be greater than the first reference voltage Vref1.

When the conversion voltage is greater than the first reference voltage Vref1, a result-high signal is output by the first comparator U1. The gate of the second transistor M2 and the gate of the third transistor M3 respectively receive the result-high signal, so the second transistor M2 will be on and the third transistor M3 will be off. The capacitor C1 is charged by the first current source S1. The positive terminal of the second comparator U2 detects the voltage of the capacitor C1. When the voltage of the capacitor C1 is greater than the second reference voltage Vref2, the second comparator U2 outputs a result-high signal to the NOT gate N1. The NOT gate N1 receives the result-high signal and outputs a result-low signal to the gate driver 601. The gate driver 601 receives the result-low signal and prompts the charge pump 602 to output a low level signal to the gate connection of the first transistor M1. The source connection of the first transistor M1 will be isolated from the drain connection of the first transistor M1 when the gate connection of the first transistor M1 receives the low level signal. Thus, the voltage regulator 30 will be disconnected from the external power source VDD and thus enjoy protection.

When the conversion voltage is less than the first reference voltage Vref1, a result-low signal is output by the first comparator U1. The gate connections of the second transistor M2 and third transistor M3 respectively receive the result-low signal. The second transistor M2 will be off and the third transistor M3 will be on. The capacitor C1 will be discharged through the second current source S2 and the voltage on capacitor C1 will be detected by the positive terminal of the second comparator U2. When the voltage of the capacitor C1 is less than the second reference voltage Vref2, the second comparator U2 outputs a result-low signal to the NOT gate N1. The NOT gate N1 will output a result-high signal to the gate driver 601. The gate driver 601 will receive the result-high signal and prompt the charge pump 602 to output a high level signal to the gate connection of the first transistor M1. The source connection of the first transistor M1 and the drain connection of the first transistor M1 will maintain connected when the gate connection of the first transistor M1 receives a high level signal.

It will be understood that particular embodiment is shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A hot swappable synchronous buck regulator, comprising:
   a voltage regulator comprising a voltage input terminal and a voltage output terminal, the voltage input terminal being configured for connected to an external power source, the voltage regulator configured for converting voltage of the external power source into a predetermined output voltage and outputting the predetermined output voltage through the output terminal;
   a sample unit comprising a first end and a second end, the first end being connected to the external power source, the sample unit configured for sampling a voltage drop of the external power source;
   a switch element comprising a first terminal, a second terminal connected to the first terminal, and a control terminal, the first terminal being connected to the second end of the sample unit, the second terminal being connected to the voltage input terminal of the voltage regulator;
   a comparison unit connected to the second end of the sample unit and configured for comparing the sampled voltage drop with a first reference voltage of the voltage regulator, and in response to the sampled voltage drop being greater than the first reference voltage, the comparison unit outputs a result-high signal;
   a time delay unit connected to the comparison unit and configured for outputting a result-low signal according to the result-high signal; and
   a control unit connected to the time delay unit and configured for outputting a low level signal to the control terminal of the switch element according to the result-low signal;
   wherein the switch element isolates the external power source from the voltage regulator when the control terminal of the switch element receives the low level signal.

2. The hot swappable synchronous buck regulator of claim 1, wherein the sample unit is a first resistor.

3. The hot swappable synchronous buck regulator of claim 2, wherein the comparison unit includes a first input terminal, a second input terminal, an output terminal, a second resistor, a first comparator, and a transformer, the first input terminal of the comparison unit is connected to the second end of the first resistor, the second input terminal of the comparison unit is connected to the external power source, the second resistor is connected between the positive terminal of the first comparator and the first input terminal of the comparison unit, the transformer is connected between the negative terminal of the first comparator and the second input terminal of the comparison unit, the transformer is configured for transforming the voltage of the external power source into a first reference voltage and inputting the first reference voltage to the negative terminal of the first comparator.

4. The hot swappable synchronous buck regulator of claim 1, wherein the switch element is a first transistor, the first transistor is an n-channel metal oxide semiconductor transistor and comprises a source connection, a drain connection, and a gate connection, the source connection of the first transistor serves as the first terminal, the drain connection serves as the second terminal, and the gate connection servers as the control terminal.

5. The hot swappable synchronous buck regulator of claim 1, wherein the time delay unit comprises a input terminal, an output terminal, a second transistor, a third transistor, a first current source, a second current source, a capacitor, a second comparator, and a NOT gate, the second transistor is an n-channel metal oxide semiconductor transistor, the gate connection of the second transistor is connected to the input terminal of the time delay unit, the drain connection of the second transistor is connected to an internal power source through the first current source, the third transistor is a p-channel metal oxide semiconductor transistor, the gate connection of the third transistor is connected to the input terminal of the time delay unit, the source connection of the third transistor is grounded, the drain connection of the third transistor is connected to the source of the second transistor through the second current source, one end of the capacitor is connected to the source of the second transistor, the other end is grounded, the positive terminal of the second comparator is connected to the source of the second transistor, the negative terminal of the second comparator is connected to a second reference voltage, the input terminal of the NOT gate is connected to the output terminal of the second comparator, the output terminal of the NOT gate servers as the output terminal of the time delay unit.

6. The hot swappable synchronous buck regulator of claim 5, wherein the control unit includes a input terminal, a output terminal, a gate driver, a charge pump, and a zener diode, the input terminal of the gate driver is connected to the input terminal of the control unit and the input terminal of the control unit is connected to the input terminal of the gate driver, the charge pump is connected to the internal power source and to the gate driver, the output terminal of the charge pump is connected to the output terminal of the control unit, the output terminal of the control unit is connected to the control terminal of the switch element, one end of the zener diode is connected to the output terminal of the charge pump, and the other end of the zener diode is grounded.

\* \* \* \* \*